United States Patent
Apostolopoulos et al.

(10) Patent No.: US 10,382,973 B1
(45) Date of Patent: Aug. 13, 2019

(54) WIRELESS BEAMFORMING OPTIMIZATION USING CLIENT LOCATION INFORMATION

(71) Applicant: Cisco Technology, Inc., San Jose, CA (US)

(72) Inventors: John George Apostolopoulos, Palo Alto, CA (US); Dan Tan, Sunnyvale, CA (US); Mehdi Nikkhah, Belmont, CA (US); Xiaoqing Zhu, Austin, TX (US); Herbert Wildfeuer, Los Altos, CA (US); Rob Liston, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/119,333

(22) Filed: Aug. 31, 2018

(51) Int. Cl.
| H04W 24/00 | (2009.01) |
| H04W 16/14 | (2009.01) |
| H04W 24/02 | (2009.01) |
| H04W 64/00 | (2009.01) |
| H04W 16/28 | (2009.01) |

(52) U.S. Cl.
CPC .......... *H04W 16/14* (2013.01); *H04W 24/02* (2013.01); *H04W 64/00* (2013.01); *H04W 16/28* (2013.01)

(58) Field of Classification Search
CPC .... H04B 7/0617; H04B 7/024; H04B 7/0695; H04B 7/086; H04B 7/0452; H04B 7/0413
See application file for complete search history.

(56) References Cited

U.S. PATENT DOCUMENTS

| 8,055,303 | B2 | 11/2011 | Wild | |
| 9,264,111 | B2 | 2/2016 | Vaughan et al. | |
| 9,769,828 | B2* | 9/2017 | Kaushik | H04B 7/0417 |
| 9,948,361 | B2 | 4/2018 | Kohli | |
| 2010/0321242 | A1* | 12/2010 | Robinson | G01S 3/48 |
| | | | | 342/445 |
| 2011/0064018 | A1* | 3/2011 | Hottinen | H04W 72/046 |
| | | | | 370/315 |

(Continued)

OTHER PUBLICATIONS

Becker, Jonathan M., "Dynamic Beamforming Optimization for Anti-Jamming and Hardware Fault Recovery", Thesis Submitted in partial fulfillment of the requirements for the degree of Doctor of Philosophy in Electrical and Computer Engineering, 264 pages, May 2014, Carnegie Mellon University.

(Continued)

*Primary Examiner* — Khalid W Shaheed
(74) *Attorney, Agent, or Firm* — Behmke Innovation Group LLC; James Behmke; Stephen D. LeBarron

(57) ABSTRACT

In one embodiment, a device determines locations of a plurality of transmitters relative to a particular wireless access point in a wireless network. One of the transmitters comprises a target client to which the particular wireless access point is to communicate. The device compares a plurality of beamforming patterns associated with the particular wireless access point to the determined locations. The device selects, based on the comparison, one of the beamforming patterns for use by the particular wireless access point to communicate with the target client. The device controls the particular wireless access point to use the selected beamforming pattern to communicate with the target client.

16 Claims, 11 Drawing Sheets

(56) References Cited

U.S. PATENT DOCUMENTS

2017/0093467 A1\* 3/2017 Molev Shteiman ........................ H04B 7/0695
2017/0171867 A1 6/2017 Garcia et al.

OTHER PUBLICATIONS

Cheung, et al., "Spectral and Energy Spectral Efficiency Optimization of Joint Transmit and Receive Beamforming Based Multi-Relay MIMO-OFDMA Cellular Networks", IEEE Transactions on Wireless Communications (vol. 13, Issue: 11, Nov. 2014), pp. 6147-6165, 2014, IEEE.
Das, Susmita., Smart antenna design for wireless communication using adaptive beam-forming approach, TENCON 2008—2008 IEEE Region 10 Conference, pp. 1-5, 2008, IEEE.
Yang, et al., "Performance of Conjugate and Zero-Forcing Beamforming in Large-Scale Antenna Systems", IEEE Journal on Selected Areas in Communications, vol. 31, No. 2, February 2013, pp. 172-179, 2013, IEEE.
Zhou, et al., "A Cooperative Beamforming Scheme in MIMO Relay Broadcast Channels", IEEE Transactions on Wireless Communications (vol. 10, Issue: 3, Mar. 2011), pp. 940-947, 2011, IEEE.
"802.11ac In-Depth", White paper, http://www.arubanetworks.com/assets/wp/WP_80211acInDepth.pdf, 37 pages, 2014, Aruba Networks, Inc.
"R710 Indoor 802.11ac Wave 2 4×4:4 Wi-Fi Access Point", https://ruckus-www.s3.amazonaws.com/pdf/datasheets/ds-ruckus-r710.pdf, 4 pages, 2017, Ruckus Wireless, Inc.

\* cited by examiner

WIRELESS BEAMFORMING OPTIMIZATION USING CLIENT LOCATION INFORMATION

TECHNICAL FIELD

The present disclosure relates generally to computer networks, and, more particularly, to wireless beamforming optimization using client location information.

BACKGROUND

Wireless networks are becoming increasingly ubiquitous, with many businesses, schools, and public areas now offering wireless connectivity to authorized users and to guests. With the increasing popularity of wireless networks, the number of different types of wireless clients is also rapidly increasing. For example, personal devices now include cellular phones, tablets, wearable devices (e.g., smart watches, head-mounted displays, etc.), and the like, of various makes, models, and configurations.

To provide better coverage to the myriad of wireless devices in a wireless network, newer wireless access points include multiple radio chains. In doing so, this allows an access point to operate in a number of different modes that support a single user (e.g., communicating with only one client at a time) or, alternatively, multiple users at the same time. From the perspective of any client of the wireless access point, the configuration parameters of the wireless access point, such as the selected communication mode, beam direction, transmit power, etc., can greatly influence the network performance seen by the client. However, even if the access point selects the optimal configuration parameters at any given point in time, the traffic patterns in the network, the set of clients, and the like, are constantly changing, meaning that this selection may be very short lived. In addition, as there are typically multiple access points in a network, improper configuration of an access point may interfere with another access point.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
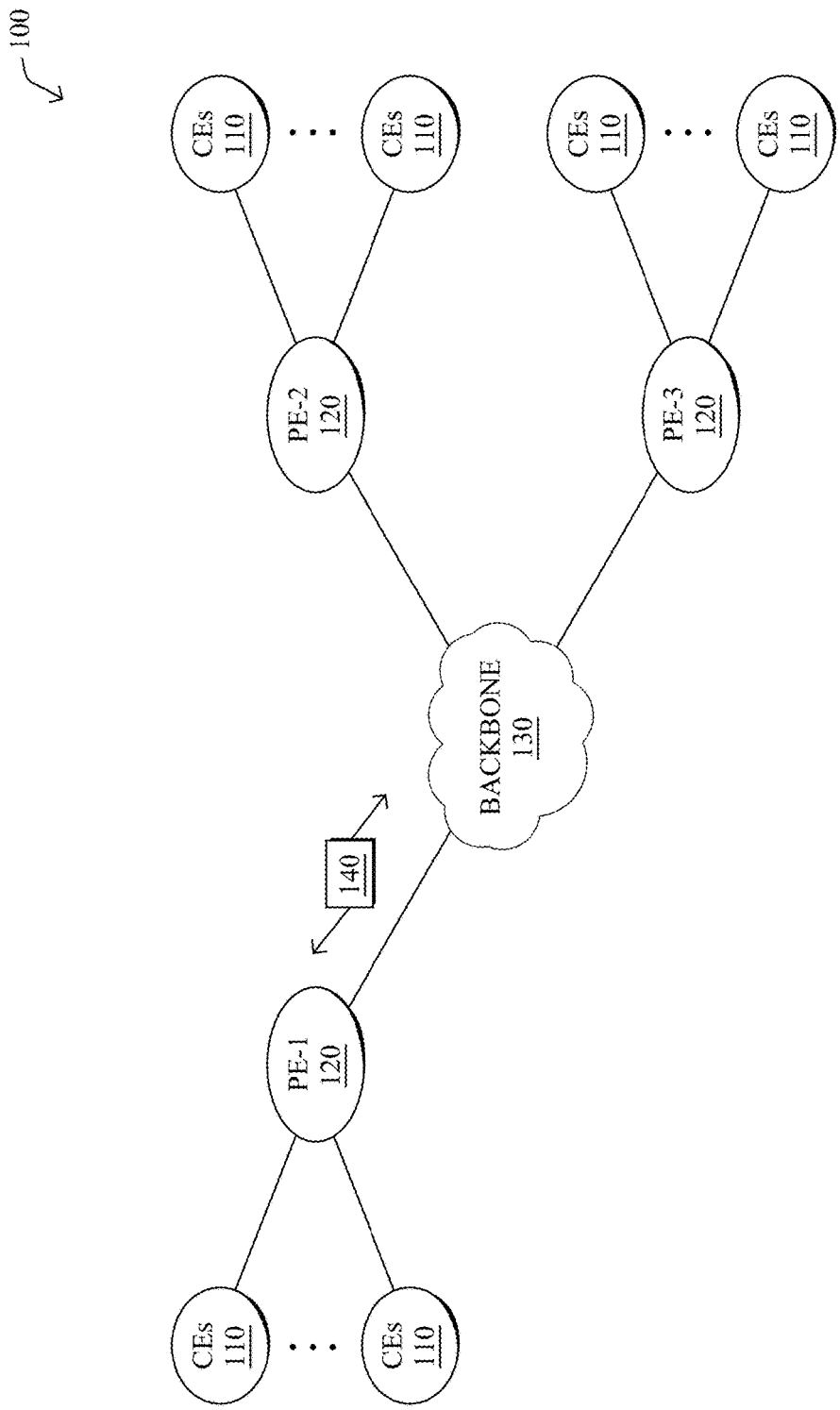
FIGS. 1A-1B illustrate an example communication network.

According to one or more embodiments of the disclosure, a device determines locations of a plurality of transmitters relative to a particular wireless access point in a wireless network. For purposes of clarity, note that such transmitters may or may not be transmitting at any given point in time and that this term is intended to simply represent the capabilities of the various clients/devices present in the wireless network. One of the transmitters comprises a target client to which the particular wireless access point is to communicate. The device compares a plurality of beamforming patterns associated with the particular wireless access point to the determined locations. The device selects, based on the comparison, one of the beamforming patterns for use by the particular wireless access point to communicate with the target client. The device controls the particular wireless access point to use the selected beamforming pattern to communicate with the target client.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
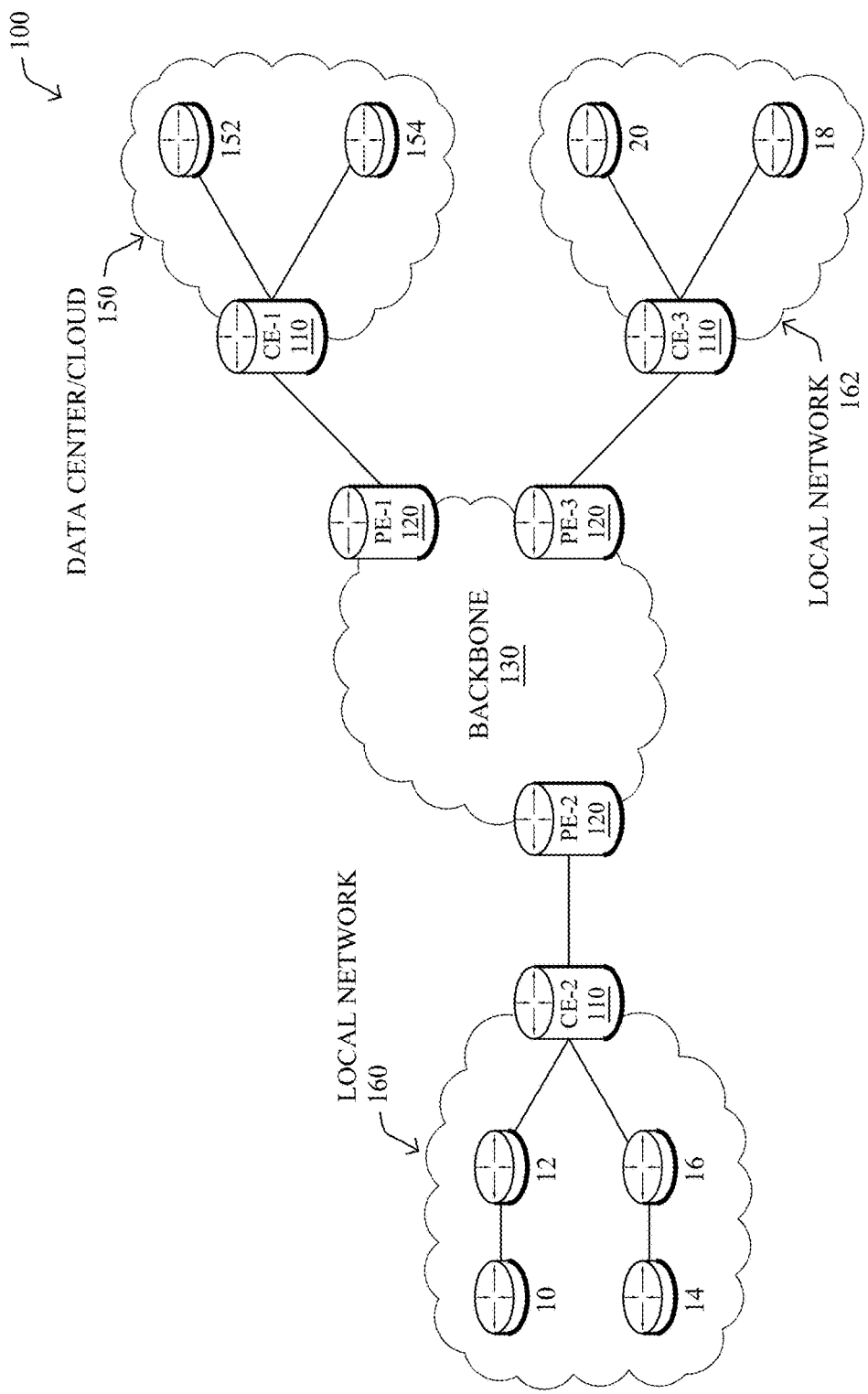

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment).

In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
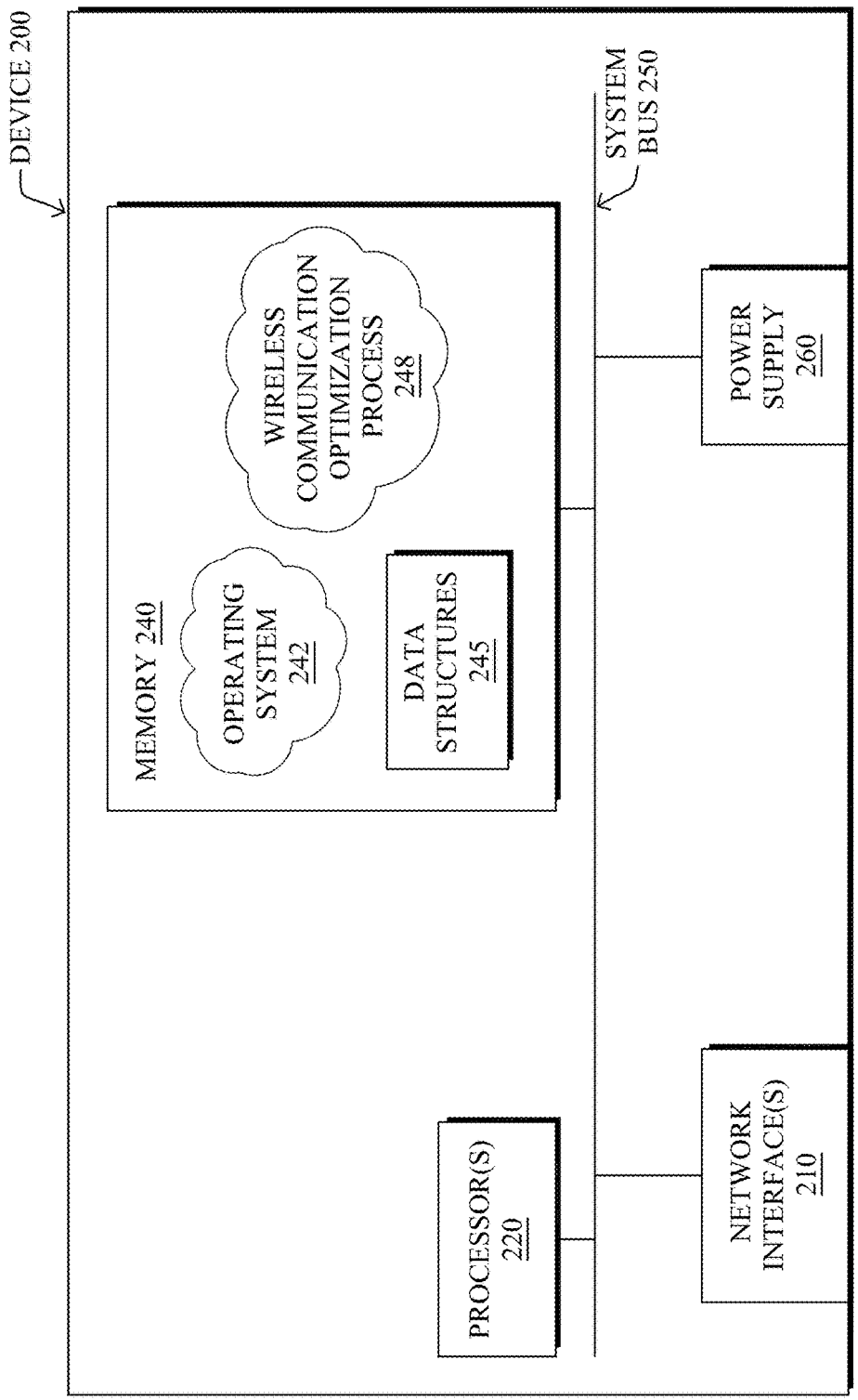
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative wireless communication optimization process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments, wireless communication optimization process 248 may utilize machine learning techniques, to monitor, analyze, and control device behavior in a wireless network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of monitoring, analyzing, and controlling device behavior in a wireless network, a learning machine may construct a model of the observed behavior of a given client or type of client. Such a model can then be used in the wireless network to control the behavior of a device in a wireless network, such as a wireless access point (AP). Example machine learning techniques that may be used to construct such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of monitoring, analyzing, and controlling device behavior in a wireless network is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of similarity (e.g., using a Euclidian distance and a cluster based local outlier factor that takes into account the cluster density). More specifically, in some embodiments, behavioral data for clients of the same type can be clustered and used to train a behavioral model for that type of client.

Replicator techniques may also be used for purposes of monitoring, analyzing, and controlling device behavior in a wireless network. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, wireless communication optimization process 248 may also use graph-based models for purposes of modeling and analyzing device behavior. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be used for purposes of modeling behavior in the network.

Figure 3:
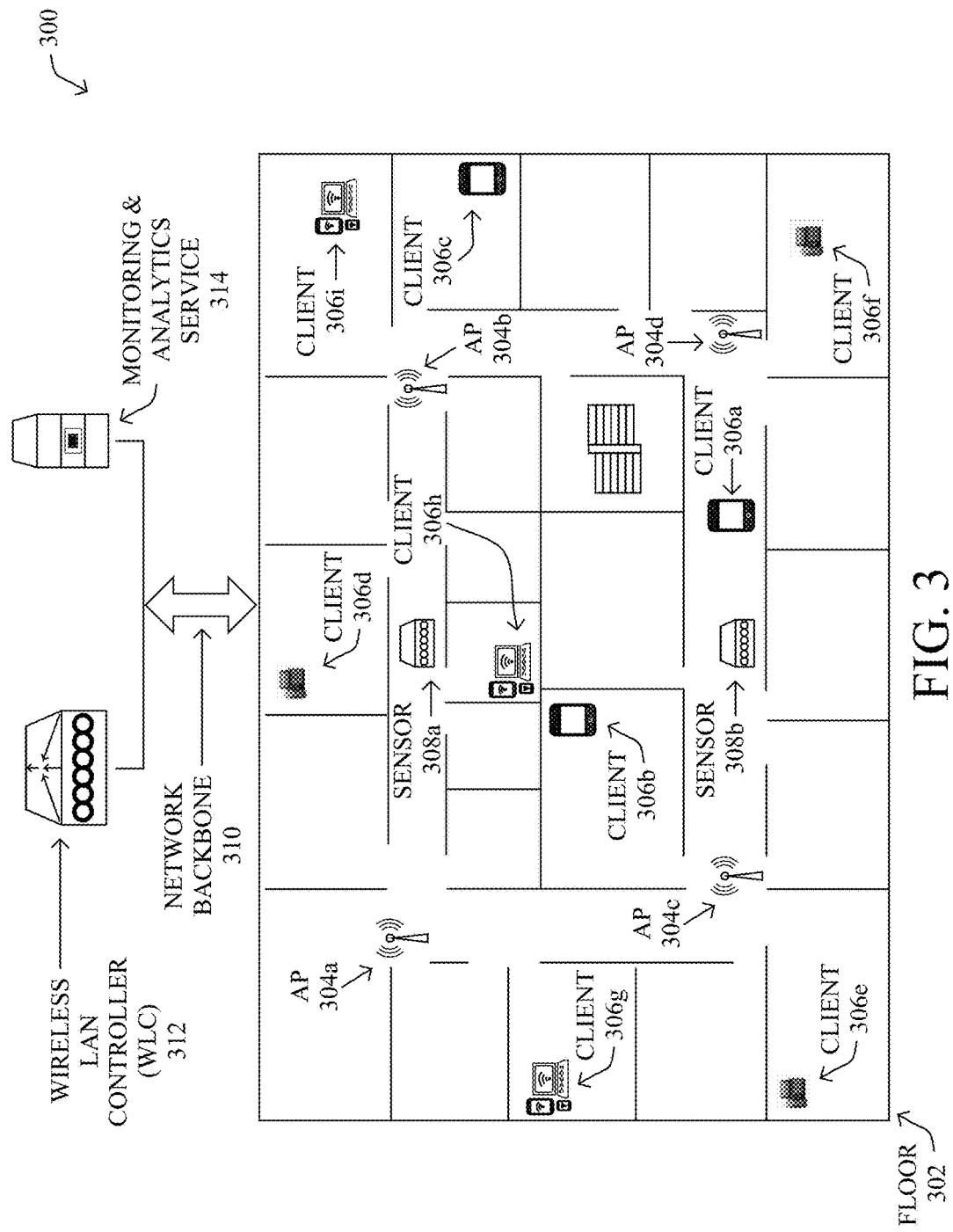
FIG. 3 illustrates an example wireless network.

FIG. 3 illustrates an example wireless network 300, according to various embodiments. Wireless network 300 may be deployed to a physical location, such as floor 302 shown, and may include various infrastructure devices. These infrastructure devices may include, for example, one or more access points (APs) 304 that provide wireless connectivity to the various wireless clients 306 distributed throughout the location. For illustrative purposes, APs 304a-304d and clients 306a-306i are depicted in FIG. 3. However, as would be appreciated, a wireless network deployment may include any number of APs and clients.

A network backbone 310 may interconnect APs 304 and provide a connection between APs 304 and any number of supervisory devices or services that provide control over APs 304. For example, as shown, a wireless LAN controller (WLC) 312 may control some or all of APs 304a-404d, by setting their control parameters (e.g., max number of attached clients, channels used, wireless modes, etc.). Another supervisory service that oversees wireless network 300 may be a monitoring and analytics service 314 that measures and monitors the performance of wireless network 300 and, if so configured, may also adjust the operation of wireless network 300 based on the monitored performance (e.g., via WLC 312, etc.).

Network backbone 310 may further provide connectivity between the infrastructure of the local network and a larger network, such as the Internet, a Multiprotocol Label Switching (MPLS) network, or the like. Accordingly, WLC 312 and/or monitoring and analytics service 314 may be located on the same local network as APs 304 or, alternatively, may be located remotely, such as in a remote datacenter, in the cloud, etc. To provide such connectivity, network backbone 310 may include any number of wired connections (e.g., Ethernet, optical, etc.) and/or wireless connections (e.g., cellular, etc.), as well as any number of networking devices (e.g., routers, switches, etc.).

In some embodiments, wireless network 300 may also include any number of wireless network sensors 308, such as sensors 308a-308b shown. In general, "wireless network sensors" are specialized devices that are able to act as wireless clients and perform testing on wireless network 300 and are not to be confused with other forms of sensors that may be distributed throughout a wireless network, such as motion sensors, temperature sensors, etc. In some cases, an AP 304 can also act as a wireless network sensor, by emulating a client in the network for purposes of testing communications with other APs. Thus, emulation points in network 300 may include dedicated wireless network sensors 308 and/or APs 304, if so configured.

During operation, the purpose of an emulation point in network 300 is to act as a wireless client and perform tests that include connectivity, performance, and/or negative scenarios, and report back on the network behavior to monitoring and analytics service 314. In turn, service 314 may perform analytics on the obtained performance metrics, to identify potential network issues before they are reported by actual clients. If such an issue is identified, service 314 can then take corrective measures, such as changing the operation of network 300 and/or reporting the potential issue to a network administrator or technician.

The types and configurations of clients 304 in network 300 can vary greatly. For example, clients 306a-306c may be mobile phones, clients 306d-306f may be office phones, and clients 306g-306i may be computers, all of which may be of different makes, models, and/or configurations (e.g., firmware or software versions, chipsets, etc.). Consequently, each of clients 306a-306i may behave very differently in wireless network 300 from both RF and traffic perspectives.

As noted above, the density of wireless devices in a wireless network is increasing at a rapid pace, both from the trend towards dense open work space, and from the number of wireless devices that each person carries. To support effective, high-density deployments, methods for sharing wireless spectrum with controlled interference are required. To this end, many modern wireless network now employ beamforming.

In general, beamforming is a wireless transmission technique that focuses the signal power in specific directions only (e.g., towards a target client) and reduces power in other directions, which may result in interference. From the perspective of the target client, this improves the signal quality to the target client and reduces the change of interfering with those clients outside of the target direction. However, depending on the beam forming pattern, beam forming can also result in increased interference with non-target clients that are also inadvertently along the target direction.

Wireless Beamforming Optimization Using Client Location Information

The techniques introduced herein allow for the optimization of a selected beamforming pattern used by a wireless access point in a wireless network. In some aspects, the optimization techniques take into account the locations and states of the transmitters in the network, such as clients and access points. In further aspects, the techniques herein introduce an approach to testing various beamforming patterns and their effects within a wireless network deployment, so as to avoid using beamforming patterns that would result in significant interference.

Specifically, according to one or more embodiments of the disclosure as described in detail below, a device determines locations of a plurality of transmitters relative to a particular wireless access point in a wireless network. One of the transmitters comprises a target client to which the particular wireless access point is to communicate. The device compares a plurality of beamforming patterns associated with the particular wireless access point to the determined locations. The device selects, based on the comparison, one of the beamforming patterns for use by the particular wireless access point to communicate with the target client. The device controls the particular wireless access point to use the selected beamforming pattern to communicate with the target client.

Illustratively, the techniques described herein may be performed by hardware, software, and/or firmware, such as in accordance with the wireless communication optimization process 248, which may include computer executable instructions executed by the processor 220 (or independent processor of interfaces 210) to perform functions relating to the techniques described herein.

Figure 4:
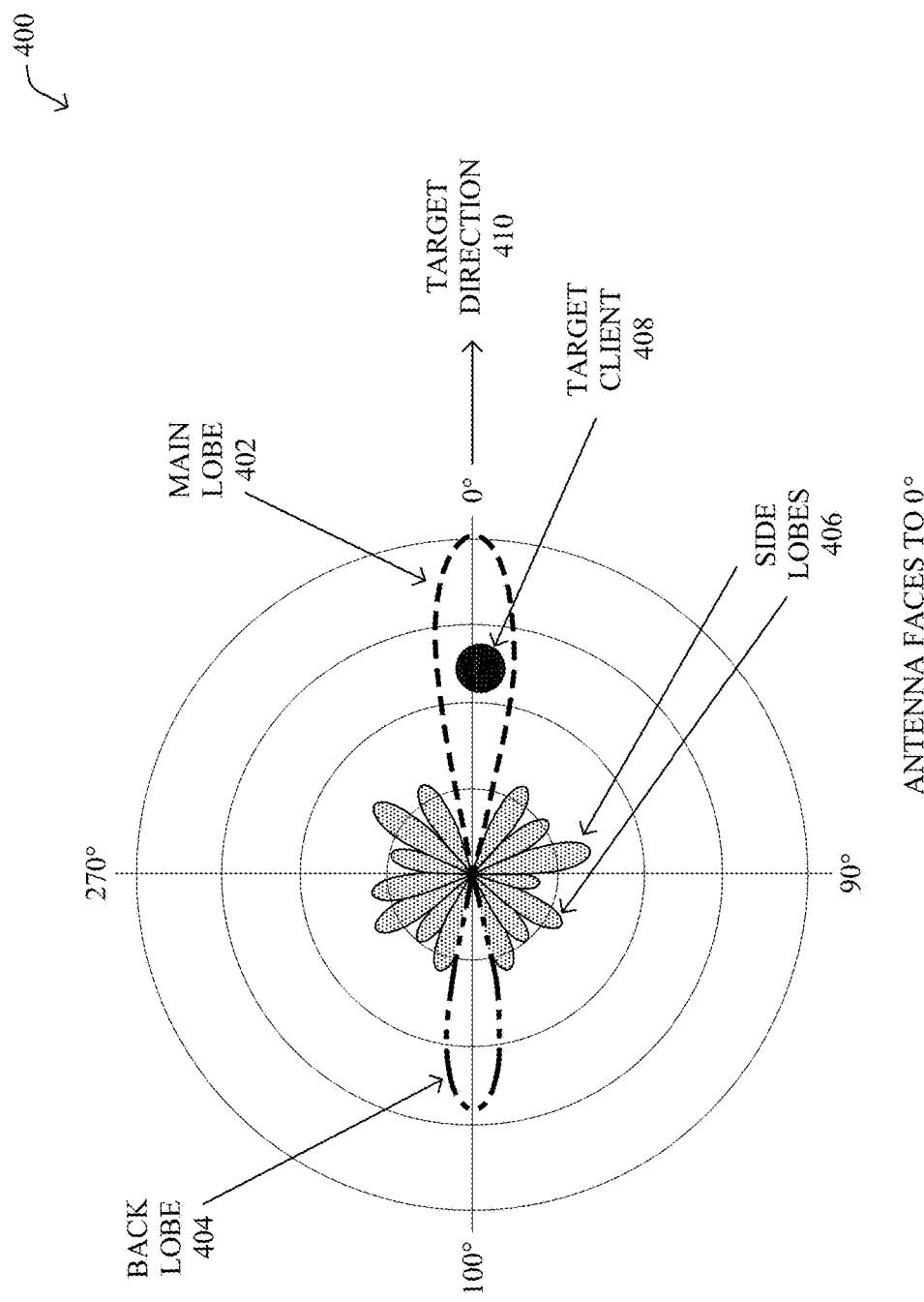
FIG. 4 illustrates an example beamforming pattern.

Operationally, FIG. 4 illustrates an example beamforming pattern 400, according to various embodiments. As noted, beamforming is becoming increasingly ubiquitous in many wireless network deployments, such as Wi-Fi networks that conform to the 802.11ac standard or above. Notably, a wireless access point (e.g., any of APs 304 shown in FIG. 3, etc.) may select and utilize beamforming pattern 400 to send data to a target client 408 shown.

As would be appreciated, multiple parameters of wireless access point control the resulting beamforming pattern. These parameters include the target direction 410 along which the target client 408 lies, as well as the transmit power used by the wireless access point. In particular, as shown, a typical beamforming pattern 400 includes a main lobe 402 that extends along the target direction 410. The transmit power used by the wireless access point affects both the distance covered by main lobe 402, as well as the overall shape of main lobe 402.

In addition to main lobe 402, beamforming pattern 400 may also include a number of side lobes 406 that extend in various other directions than that of the target direction. Typically, and by definition, side lobes 406 are of considerably smaller magnitude than that of main lobe 402, thereby extending a much shorter distance from the access point than that of main lobe 402.

Extending in the opposite direction as that of target direction 410 may also be a back lobe 404. As shown, back lobe 404 may be of smaller magnitude than that of main lobe 402, but of greater magnitude than that of side lobes 404.

Note that beamforming pattern 400 shown, as well as the other beamforming patterns illustrated in FIGS. 5A-5D, are illustrative only and that the specific characteristics of the deployment environment can greatly affect the interference patterns that result. For example, signals that are reflected off of walls in an indoor environment can, and often do, cause a certain degree of interference to the beam, thus causing the beam pattern to also affect other regions. These interference patterns are typically much harder to determine, but can also be taken into account using the techniques below.

Multi-user, multiple input and multiple output (MIMO) mode wireless access points typically compute a beamforming pattern so that multiple clients can be sent transmissions at the same time. This is done in such a manner that each client receives its desired signal with high strength, and the signals intended for other clients (e.g., interference) at a reduced strength. In classical multi-user MIMO, there is no knowledge of the actual floor-plan location of the clients or, more generally, of the relative spatial location of the other transmitters in the network, such as APs and clients.

The relative spatial location of APs, clients, and other transmitters in an environment can be estimated using various, independent wireless localization methods, including hyper location in the Connected Mobile Experiences (CMX) product from Cisco Systems, Inc. In various embodiments, by estimating the relative spatial relationship of the APs, clients, etc. relative to a particular access point in an environment, the directional relationship between the transmitting access point and its surrounding clients, access points, etc. can also be estimated. In turn, this information can be used to evaluate whether a particular beamforming pattern to be used by the reference access point is desirable (e.g., will minimize interference with the non-target clients and other devices). Such an analysis can be performed by the access point itself, by the WLC overseeing the access point, or by a monitoring and analytics service that supervises the access point.

First, assume that there are multiple sets of beamforming patterns that could be used by a particular access point, each set being capable of supporting concurrent transmission to a set of devices D. In addition to the devices D, there may also be any number of other devices in the area that are not in D, but would be covered by the beamforming patterns, thus potentially interfering with these device(s). These other devices can be classified into two groups: the set A that are associated with the access point under analysis and the set N that are not. For the devices in set A, they cannot transmit or receive while the access point is in operation, so it is desirable that they experience interference, to avoid inadvertent uplink transmission. However, interference is strongly undesirable for the devices in set N. Therefore, a beamforming pattern should be selected so as to minimize the number of devices in N that would potentially experience interference. In further embodiments, whether the device is active or not may also be taken into consideration. Indeed, even if the beamforming pattern would otherwise cause interference, this would not be a problem if the affected device is asleep at the time.

Second, the potentially affected devices can be estimated to be either stationary or moving. In some embodiments, since the system estimate of device locations may often be delayed, the above beamforming selection can be weighted to discourage interference with stationary client, whose locations are assumed to be known with higher accuracy, over that of moving clients, whose location are likely to be known with much lower accuracy.

Third, inference with other access points using the same wireless channels as the reference access point should be avoided. Notably, the reference access point may, in some cases, be within communication distance of other access points in the wireless network. If both access points are transmitting on the same wireless channel, this can cause interference and disrupt communications.

Therefore, according to various embodiments, the system introduced herein learns the spatial relationship between all of the access points and clients in an area and, as each access points selects its beamforming for communicating to its associated clients, it utilizes the associated mapping to select the beamforming to maximize signal strength to the desired client(s) while minimizing interference to neighboring clients and APs that are using the same channel.

Note that the knowledge of interference level at a given location $<x_i, y_i>$ for a given beam-forming pattern k of $AP_j$ can either be derived based on their spatial relationship, or gathered via measurements. For example, clients enabled with CMX localization can periodically report on the interference level observed from neighboring access points to a central entity. The central entity (e.g., a WLC, a monitoring and analytics service, etc.) can correlate these reports with the beamforming pattern of the corresponding access points, to log entries of measured interference as a function of location and access point beamforming pattern. Alternatively, each access point can aggregate the mapping information relative to its surrounding clients and access points and perform its own beamforming decision making.

The beamforming selection can be implemented using any number of optimization approaches. For example, the optimization process may entail analyzing a single wireless channel at a time and defining the optimization problem as a cost function to be optimized. The inputs to such a cost function may include the list of access point locations, a list of client locations, flags indicating whether each client is stationary or moving, a list of attachments/associations between access points and clients (e.g., AP, client tuples), and a beamforming pattern for one of the access points that is under consideration.

FIGS. 5A-5D illustrate example beamforming pattern scenarios that can be taken into consideration by the cost function to be optimized, in various embodiments. As shown, assume that there are a plurality of access points, one of which is the reference access point 502a for which a beamforming pattern is to be selected to communicate with a target client 504. In addition, assume that there are also a number of other clients 506 located throughout the area. Links 508 denote attachments between clients 504, 506 and their respective access points 502. As some clients 504, 506 are stationary, their locations may be relatively known and, thus, estimated at a narrower range than that of mobile clients.

Figure 5A:
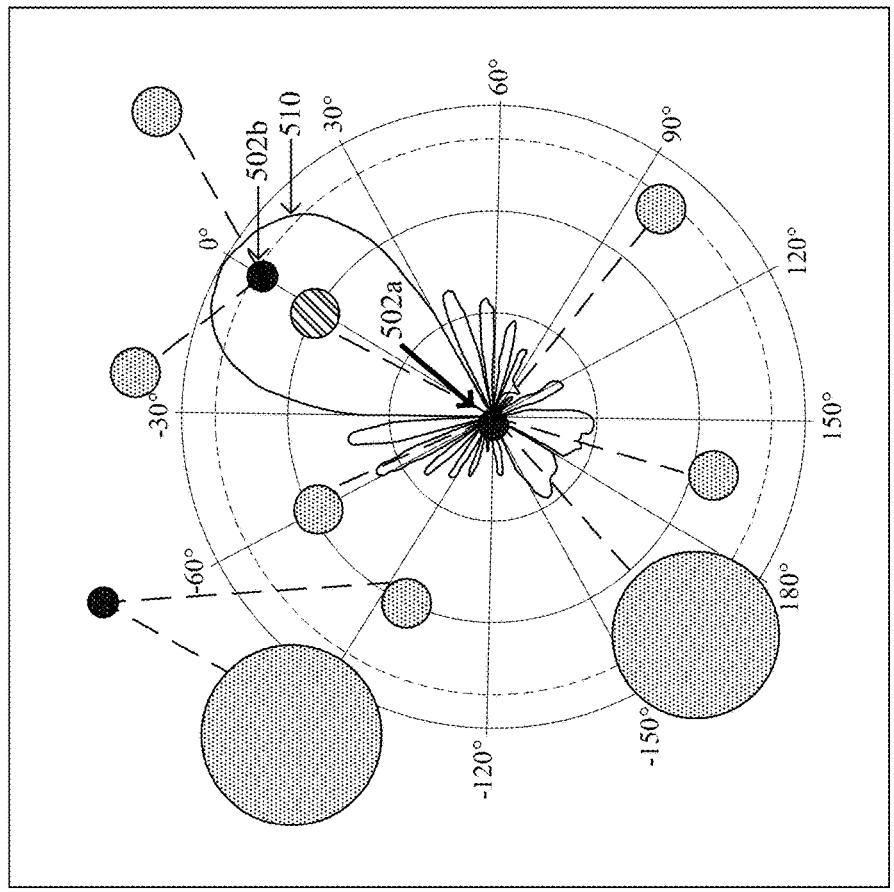
FIGS. 5A-5D illustrate example beamforming pattern scenarios.
Figure 5A:
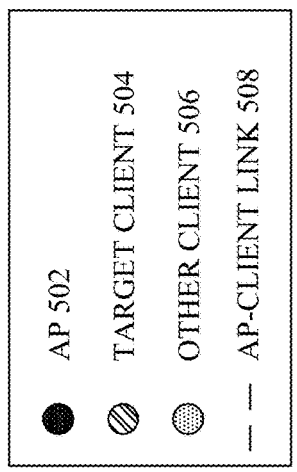

FIG. 5A illustrates a first potential scenario whereby the beamforming pattern 510 for access point 502a under analysis is directed towards the target client 504. However, the main lobe of beam pattern 510 extends beyond target client 504 and also overlaps the location of another access point 502b. If both access point 502a and access point 502b are on the same channel, this means that beamforming pattern 510 could inadvertently interfere with access point 502b.

Figure 5B:
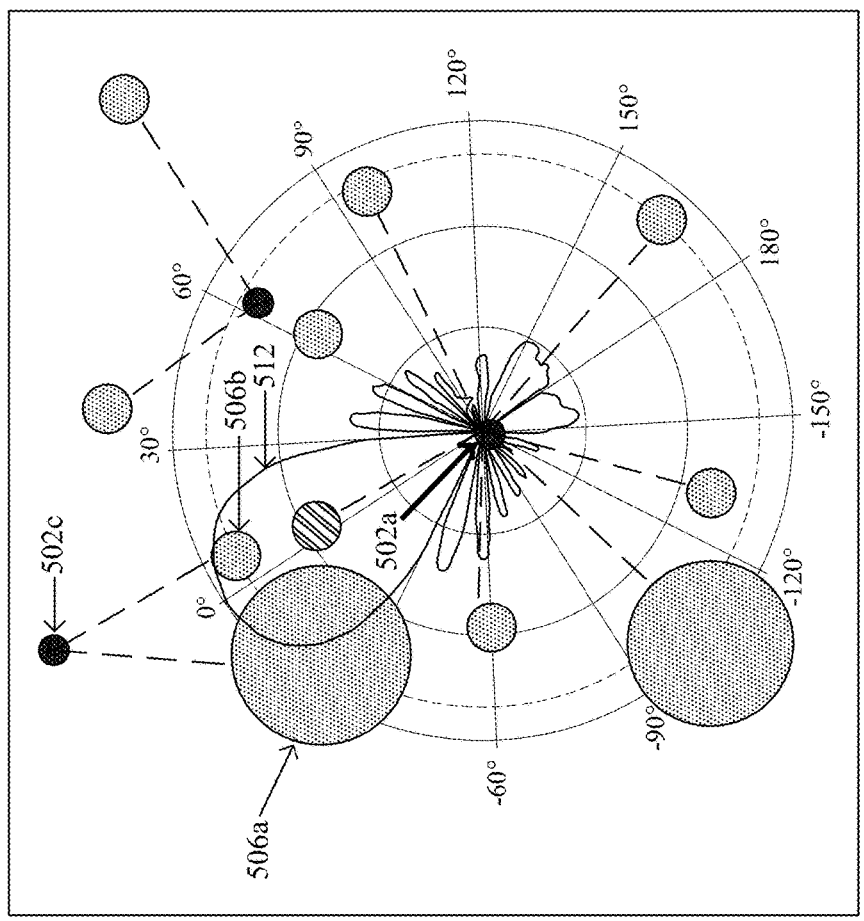
Figure 5B:
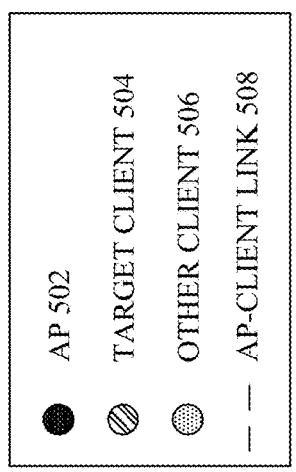

FIG. 5B illustrates a second potential scenario whereby candidate beamforming pattern 512 for access point 502a will reach the target client 504, but would also overlap the estimated locations of other clients 502a (e.g., a mobile client) and 502b (e.g., a stationary client), which are attached to another access point 502c. Similar to the scenario in FIG. 5A, this means that beamforming pattern 512 could cause interference for clients 506a-506b.

Figure 5C:
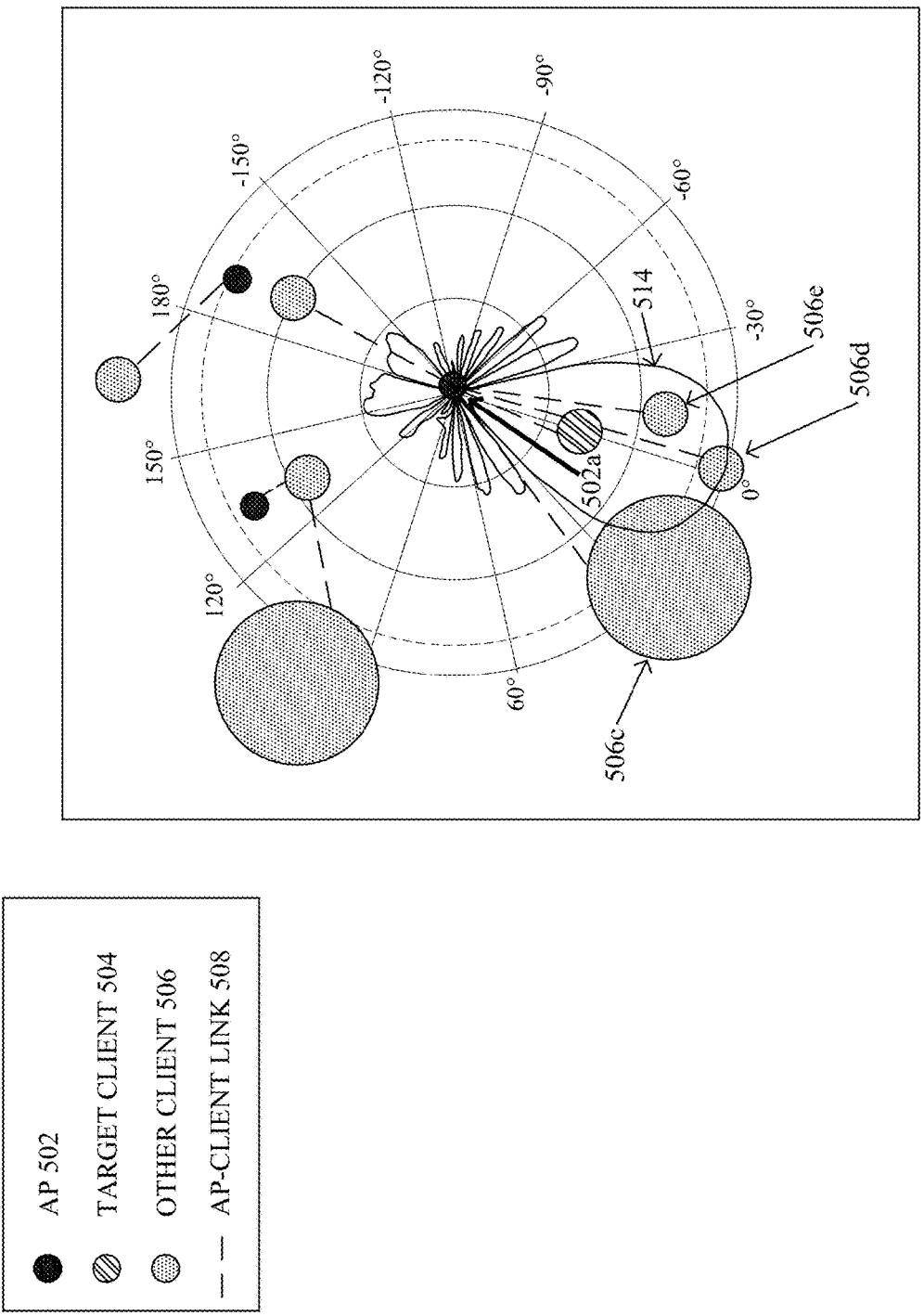

FIG. 5C illustrates a third potential scenario whereby candidate beamforming pattern 514 for access point 502a will again reach target client 504. Similar to the scenario in FIG. 5B, beamforming pattern 514 also overlaps the estimated locations of other clients 506c-506e. In this scenario, however, other clients 506c-506e are also attached to access point 502a, meaning that beamforming pattern 514 will not negatively interfere with clients 506c-506e, but instead provides collision sense information to inactive clients on the same access point.

Figure 5D:
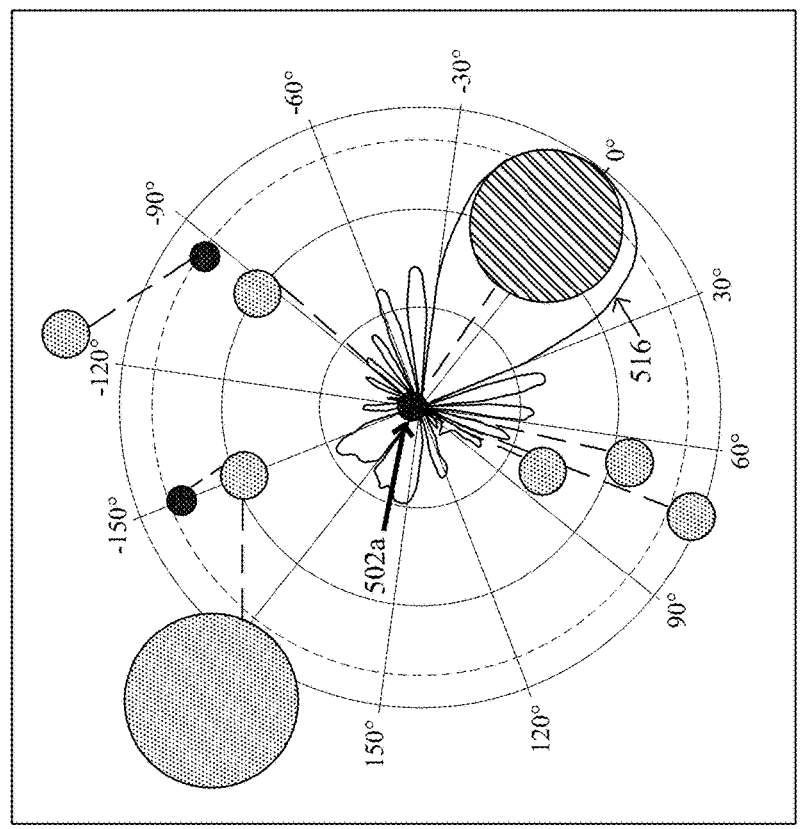
Figure 5D:
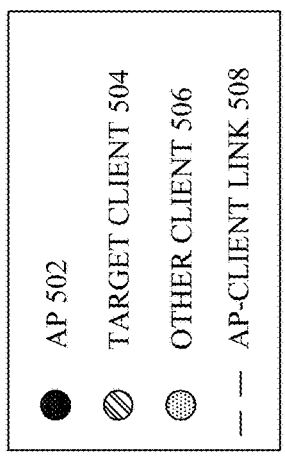

FIG. 5D illustrates a fourth potential scenario whereby candidate beamforming pattern 516 for access point 502a will reach target client 504, which is a moving client. As would be appreciated, since target client 504 is a moving client in this scenario, there exists a greater possibility of beamforming pattern 516 not being optimized for the true location of target client 504.

In some embodiments, the beamforming optimization process may construct a feature vector based on the integer counts for any combination of the scenarios above. In turn, the optimization process may attempt to identify the optimal beamforming pattern through analysis of the feature vectors associated with the set of patterns under consideration. For example, one possible optimization would be to form a weighted sum followed by a threshold function, resulting in a binary result that indicates whether the beamforming pattern would be acceptable for use by the access point. In another embodiment, the optimization process could randomly evaluate the beamforming candidates until a suitable match is found. Alternatively, the process could use a distance metric to compare the feature vectors for the different beamforming pattern candidates and employ a gradient-like search, to select the optimal pattern.

According to some embodiments, different beamforming patterns can be tested in the wireless network, to aid in the selection of an optimal pattern for a given access point. Notably, there is a continuous set of beamforming patterns that could be used by the access point. By leveraging the testing of the effects of different beamforming patterns in the network, the optimization process can learn which patterns and/or ranges of patterns would result in undesirable conditions, such as interference with other transmitters in the network.

Figure 6:
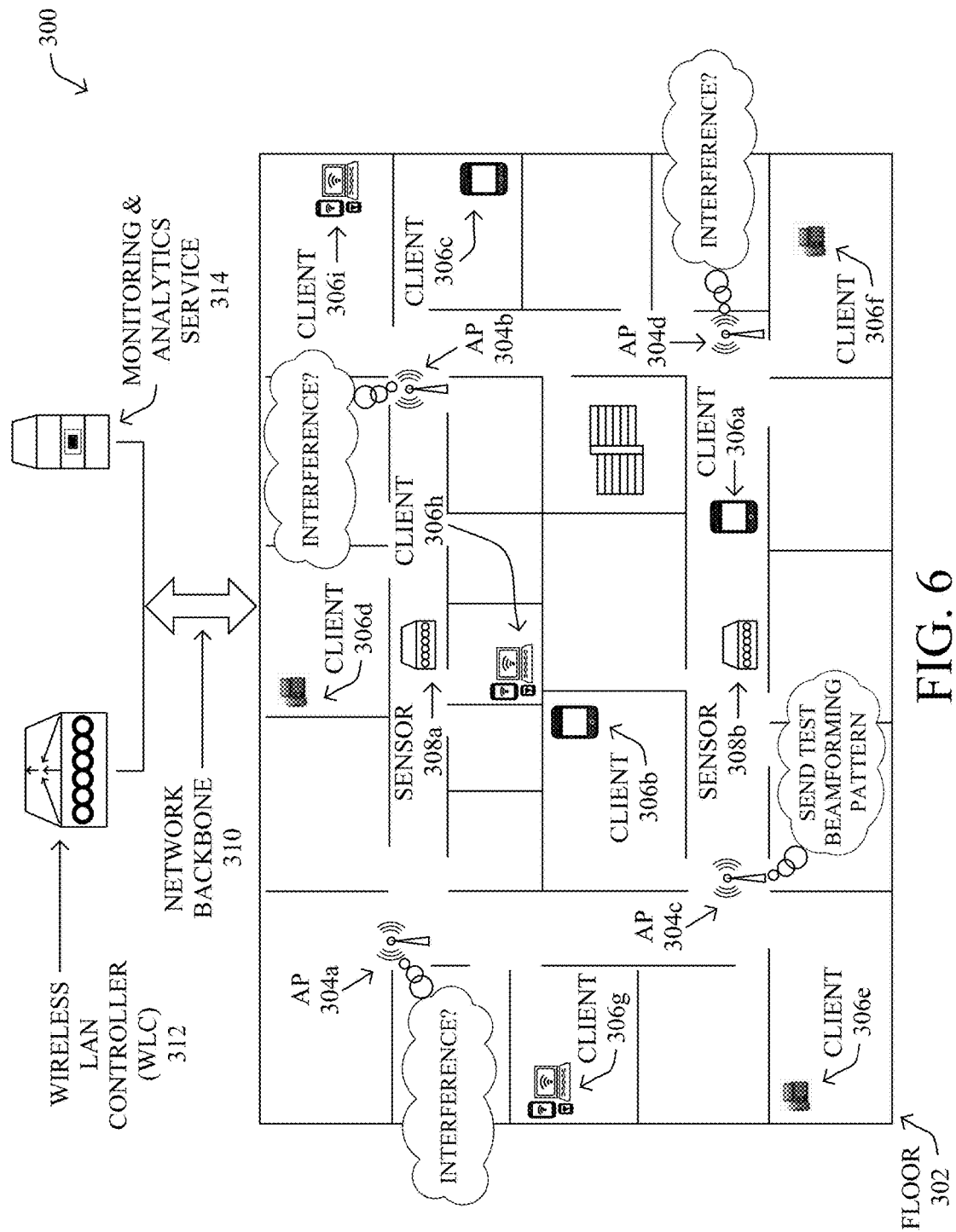
FIG. 6 illustrates an example beamforming pattern test in a wireless network.

FIG. 6 illustrates an example beamforming pattern test in a wireless network, according to various embodiments. As shown, consider the wireless network 300 described previously with respect to FIG. 3 and assume that AP 304c could use any number of different beamforming patterns to communicate with a particular client, such as client 306a. While the actual range of beamforming patterns that AP 304c could use is continuous, for testing purposes, only a finite set of patterns may be tested. For instance, M-number of patterns can be selected for testing (e.g., M=100, M=1000, etc.).

Once the test set of beamforming patterns has been identified, AP 304c may begin exploring the effects of these patterns by transmitting using each of the test patterns. In turn, the clients 306, other APs 304, and/or other devices in network 300 (e.g., sensors 308, etc.) may sense any resulting interference and report the test results to the test supervisory (e.g., WLC 312, service 314, AP 304c, etc.). This can be done by looking at the RSSI values of the signals that AP 304c transmitted with each beamforming pattern tested. In other words, APs 304a-304b and 304d shown may listen when AP 304c transmits using each test beamforming pattern and report the observed RSSI value back to the initiator of the test.

By collecting the measurement data from the network for each of the tested beamforming patterns, the optimization process can determine the impact of each pattern on the other APs 304 and/or clients 306 in network 300. In one embodiment, the optimization process may build a table for AP 304c and rate each beamforming pattern according to the interference that it creates. For example, the table can be an M×N table where each row M corresponds to the use of a particular beamforming pattern and the columns store the resulting RSSI values for the other APs and/or clients in the network. This process can also be repeated to test beamforming patterns at each of APs 304 in network 300 as the transmitter. Note that this will create a 3-D table that is N×M×N (e.g., N-number of APs 304, M-number of beamforming patterns tested for each AP, and N-number of receiving APs).

In some embodiments, the testing of the beamforming patterns can be scheduled in network 300. For example, the optimization process may identify a time of low user traffic in network 300, such as at night, to perform the beamforming pattern tests. Note that the position of AP 304 generally do not change and, similarly, environmental effects (e.g., walls that lead to reflection or attenuation) generally do not change. Therefore, these aspects of learning how to minimize co-AP interference lead to preferred beamforming patterns for each AP 304 that are long lived. On the other hand, clients can appear and move on a daily, hourly, or minute-based timescales. Therefore, the optimization process may track the long-timescale and short-timescale interferences, separately. Furthermore, the optimization process may keep track of which short-term interferences occur frequently and remember them for subsequent selection. For example, users may sit with their laptops or smartphones in the same location every day from 9:00-12:00. In such a case, the optimization process can learn and account for this periodic pattern over time.

Once the effects of the tested beamforming patterns have been captured, the optimization process can distinguish between those that result in little or no interference and those that result in significant interference. Note that this testing approach has the advantage of being measurement based rather than model-based. In other words, a theoretical beamforming pattern that may interfere with another access point in free space, but is stopped by a wall in a specific site would be properly accounted for. As would be appreciated, the beamforming patterns that do not cause interference with other access points are preferred. In cases where the testing does not collect RSSI measurements from clients 306, the effects of a given beamforming pattern can be estimated based on the relative location of the client to the transmitting access point. For example, if a particular beamforming pattern would interfere with a particular access point, it is also safe to assume that this pattern would also interfere with other clients near that access point.

To further learn the impact of a beamforming pattern on the clients 306 in network 300, each AP 304 may transmit using their preferred/selected beamforming patterns to their target clients. However, there may still be interference that results with other clients 306, if the testing process only captures RSSI measurements from the other APs 304. To also consider the effects of a beamforming pattern on clients 306, let $C_{interfered}$ represent the client 306 that experiences interference from a given beamforming pattern. First, if the testing AP 304c can receive transmissions from $C_{interfered}$, the projected pattern direction that is leading to the interference can be estimated based on reciprocity. Alternatively, when AP 304c transmits a signal using one of the preferred beamforming patterns, and this causes interference for a client of another AP 304 (e.g., client 306a attached to AP 304d), then AP 304d could sense the interference from the resulting retransmissions. This information can be fed back to the optimization process, to indicate the interference.

When it is determined that a particular beamforming pattern results in interference, either at another AP or a non-targeted client, the optimization process may remove that pattern from further consideration and use. For example, the testing approach herein can be used to reduce a set of test patterns down to a subset from which an optimal pattern can be selected using the techniques described previously. Notably, the overall goal of the optimization process may be to select a beamforming pattern that (a) provides a high-quality connection to the target client, (b) does not interfere with other APs (e.g., as determined during pattern testing), and (c) is maximally different from the pattern(s) that caused interference with the other non-target client(s). Note that, in most cases, the combination of (a), (b), (c) corresponds to selecting a beam-forming pattern which still has a main lobe oriented toward the desired client, either directly or via reflection, but the secondary lobes would change with the hope that one of the secondary lobes was causing the interference and that by changing the secondary lobes we can reduce/eliminate the interference. In this manner, the optimization process can continue to learn in an online fashion, even as clients appear and move around in the network.

Figure 7:
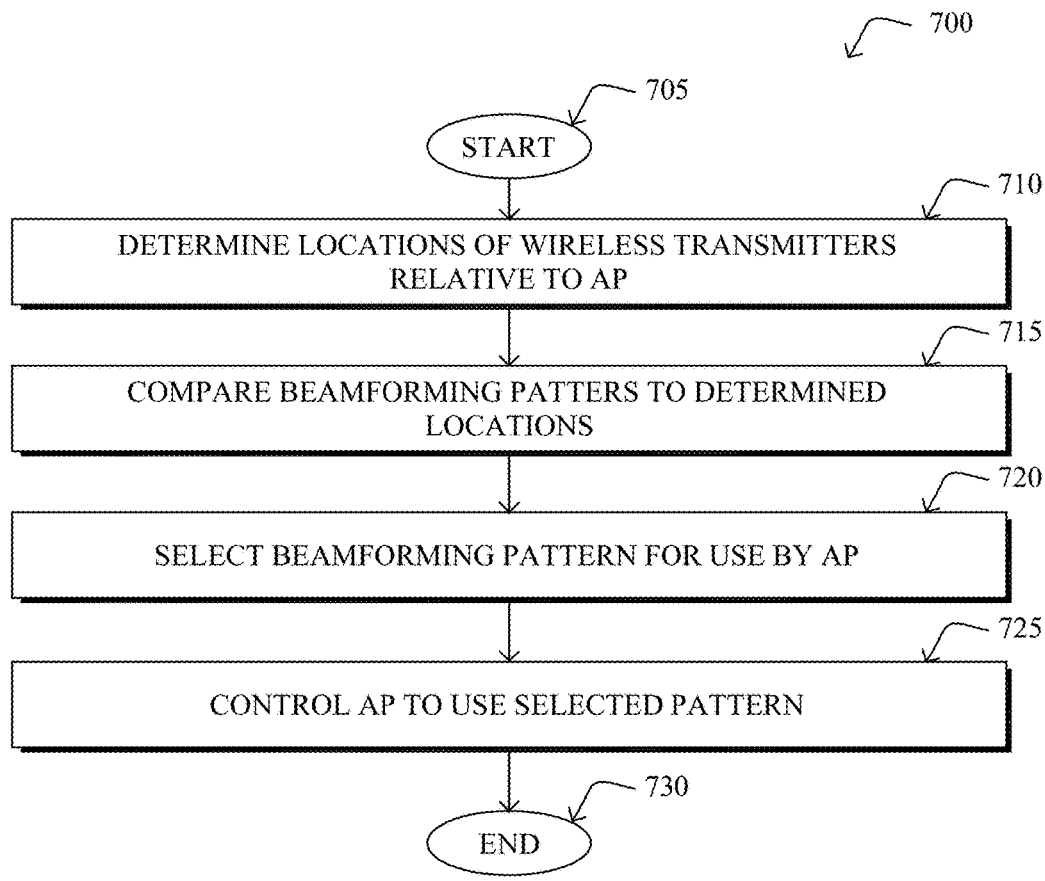
FIG. 7 illustrates an example simplified procedure for selecting a beamforming pattern for a wireless access point.

FIG. 7 illustrates an example simplified procedure for selecting a beamforming pattern for a wireless access point, in accordance with one or more embodiments described herein. For example, a non-generic, specifically configured device (e.g., device 200) may perform procedure 700 by executing stored instructions (e.g., process 248), either locally in the network under analysis (e.g., the device may be a WLC or the transmitting AP itself) or as part of a cloud-based service that oversees the network. The procedure 700 may start at step 705, and continues to step 710, where, as described in greater detail above, the device may determine locations of a plurality of transmitters relative to a particular wireless access point in a wireless network. One of the transmitters is a target client to which the particular wireless access point is to communicate. For example, the locations may correspond to the locations of other wireless access points of the network and/or wireless clients in the network.

At step 715, as detailed above, the device may compare a plurality of beamforming patterns associated with the particular wireless access point to the determined locations. For example, based on the estimated locations of the other access points and/or clients in the network, the device may determine whether the beamforming pattern is expected to overlap any of these other transmitters, in addition to that of the target client.

At step 720, the device may select, based on the comparison, one of the beamforming patterns for use by the particular wireless access point to communicate with the target client, as described in greater detail above. In some embodiments, the device may select the beamforming pattern that is expected not to interfere with other access points or non-target clients or, if the possibility of interference cannot be fully prevented, to minimize interference as much as possible. In one embodiment, the device may apply a weighting so as to favor minimizing interference with stationary clients over mobile clients.

At step 725, as detailed above, the device may control the particular wireless access point to use the selected beamforming pattern to communicate with the target client. In yet another embodiment, the selected beamforming patterns of multiple target clients can be combined to support concurrent transmission to them in multi-user MIMO mode. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for dynamically tracking/modeling systems according to risk level, it is to be understood that various other adaptations and modifications may be made within the spirit and scope of the embodiments herein. For example, while certain embodiments are described herein with respect to using certain models for purposes of wireless beamforming, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    determining, by a device, locations of a plurality of transmitters relative to a particular wireless access point in a wireless network, wherein one of the transmitters comprises a target client to which the particular wireless access point is to communicate;
    comparing, by the device, a plurality of beamforming patterns associated with the particular wireless access point to the determined locations;
    selecting, by the device and based on the comparison, one of the beamforming patterns for use by the particular wireless access point to communicate with the target client, wherein selecting the beamforming pattern for use by the particular wireless access point to communicate with the target client includes:
        forming a feature vector for each of the beamforming patterns, each feature vector quantifying potential interference that would result from the beamforming pattern; and
        using a gradient search to compare the feature vectors for the beamforming patterns; and
    controlling, by the device, the particular wireless access point to use the selected beamforming pattern to communicate with the target client; and
    controlling, by the device, the particular wireless access point to emit a test of a set of beamforming patterns;
    receiving, at the device, measurement data captured by one or more other wireless access points during the tests of the beamforming patterns by the particular wireless access point; and
    associating, by the device, the measurement data with the beamforming patterns in the set of beamforming patterns.

2. The method as in claim 1, wherein the plurality of transmitters comprises at least one of: a second client or a second wireless access point in the wireless network.

3. The method as in claim 1, wherein selecting the beamforming pattern for use by the particular wireless access point to communicate with the target client comprises:
    selecting a beamforming pattern from among the plurality of beamforming patterns that maximizes signal strength to the target client while minimizing interference with the other transmitters in the plurality.

4. The method as in claim 3, wherein selecting the beamforming pattern for use by the particular wireless access point to communicate with the target client further comprises:
    applying a weighting to the other transmitters, to favor minimizing interference with stationary transmitters over mobile transmitters.

5. The method as in claim 1, further comprising:
    excluding, by the device, one of the set of beamforming patterns from inclusion in the plurality of beamforming patterns based on the measurement data associated with the excluded beamforming pattern.

6. The method as in claim 1, further comprising:
    scheduling, by the device, the tests of the beamforming patterns by the particular wireless access point.

7. The method as in claim 1, further comprising:
    selecting, by the device and based on the comparison, a combination of the beamforming patterns for use by the particular wireless access point to communicate with a plurality of target clients; and
    controlling, by the device, the particular wireless access point to use the selected combination of beamforming patterns to communicate with the plurality of target clients in multi-user, multiple input and multiple output (MIMO) mode.

8. An apparatus comprising:
    one or more network interfaces to communicate with a network;
    a processor coupled to the network interfaces and configured to execute one or more processes; and
    a memory configured to store a process executable by the processor, the process when executed configured to:
    determine locations of a plurality of transmitters relative to a particular wireless access point in a wireless network, wherein one of the transmitters comprises a target client to which the particular wireless access point is to communicate;
    compare a plurality of beamforming patterns associated with the particular wireless access point to the determined locations;
    select, based on the comparison, one of the beamforming patterns for use by the particular wireless access point to communicate with the target client, wherein selection of the beamforming pattern for use by the particular wireless access point to communicate with the target client includes:
    forming a feature vector for each of the beamforming patterns, each feature vector quantifying potential interference that would result from the beamforming pattern; and
    using a gradient search to compare the feature vectors for the beamforming patterns; and
        control the particular wireless access point to use the selected beamforming pattern to communicate with the target client; and
        control the particular wireless access point to emit a test of a set of beamforming patterns;
        receive measurement data captured by one or more other wireless access points during the tests of the beamforming patterns by the particular wireless access point; and
        associate the measurement data with the beamforming patterns in the set of beamforming patterns.

9. The apparatus as in claim 8, wherein the plurality of transmitters comprises at least one of: a second client or a second wireless access point in the wireless network.

10. The apparatus as in claim 8, wherein the apparatus selects the beamforming pattern for use by the particular wireless access point to communicate with the target client by:
    selecting a beamforming pattern from among the plurality of beamforming patterns that maximizes signal strength to the target client while minimizing interference with the other transmitters in the plurality.

11. The apparatus as in claim 10, wherein the apparatus further selects the beamforming pattern for use by the particular wireless access point to communicate with the target client by:
    applying a weighting to the other transmitters, to favor minimizing interference with stationary transmitters over mobile transmitters.

12. The apparatus as in claim 8, wherein the process when executed is further configured to:
    exclude one of the set of beamforming patterns from inclusion in the plurality of beamforming patterns based on the measurement data associated with the excluded beamforming pattern.

13. The apparatus as in claim 8, wherein the process when executed is further configured to:
    schedule the tests of the beamforming patterns by the particular wireless access point.

14. The apparatus as in claim 8, wherein the device is located outside of the wireless network and provides a cloud-based service to the wireless network.

15. A tangible, non-transitory, computer-readable medium storing program instructions that cause a device to execute a process comprising:
    determining, by the device, locations of a plurality of transmitters relative to a particular wireless access point in a wireless network, wherein one of the transmitters comprises a target client to which the particular wireless access point is to communicate;
    comparing, by the device, a plurality of beamforming patterns associated with the particular wireless access point to the determined locations;
    selecting, by the device and based on the comparison, one of the beamforming patterns for use by the particular wireless access point to communicate with the target client, wherein selecting the beamforming pattern for use by the particular wireless access point to communicate with the target client includes:
        forming a feature vector for each of the beamforming patterns, each feature vector quantifying potential interference that would result from the beamforming pattern; and
    using a gradient search to compare the feature vectors for the beamforming patterns; and
        controlling, by the device, the particular wireless access point to use the selected beamforming pattern to communicate with the target client; and
        controlling, by the device, the particular wireless access point to emit a test of a set of beamforming patterns;
        receiving, at the device, measurement data captured by one or more other wireless access points during the tests of the beamforming patterns by the particular wireless access point; and
        associating, by the device, the measurement data with the beamforming patterns in the set of beamforming patterns.

16. The computer-readable medium as in claim 15, wherein the plurality of transmitters comprises at least one of: a second client or a second wireless access point in the wireless network.

* * * * *